US009514133B1

(12) United States Patent
Kursun

(10) Patent No.: US 9,514,133 B1
(45) Date of Patent: Dec. 6, 2016

(54) SYSTEM AND METHOD FOR CUSTOMIZED SENTIMENT SIGNAL GENERATION THROUGH MACHINE LEARNING BASED STREAMING TEXT ANALYTICS

(71) Applicant: JPMorgan Chase Bank, N.A., New York, NY (US)

(72) Inventor: Eren Kursun, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 229 days.

(21) Appl. No.: 13/972,388

(22) Filed: Aug. 21, 2013

Related U.S. Application Data

(60) Provisional application No. 61/839,061, filed on Jun. 25, 2013.

(51) Int. Cl.
*G06F 7/00* (2006.01)
*G06F 17/30* (2006.01)

(52) U.S. Cl.
CPC ... *G06F 17/30011* (2013.01); *G06F 17/30598* (2013.01); *G06F 17/30867* (2013.01)

(58) Field of Classification Search
CPC .............. G06F 17/30705; G06F 17/30731; G06F 17/30864; G06F 17/30321; G06F 17/30572
See application file for complete search history.

(56) References Cited

U.S. PATENT DOCUMENTS

| | | | |
|---|---|---|---|
| 5,458,235 A * | 10/1995 | Stone ................ | B65D 5/4204 206/232 |
| 5,769,770 A * | 6/1998 | Savage ..................... | B31B 1/62 229/87.19 |
| 6,424,980 B1 | 7/2002 | Iizuka et al. | |
| 6,807,544 B1 | 10/2004 | Morimoto et al. | |
| 7,965,305 B2 * | 6/2011 | Miller ................... | G09G 3/3225 345/581 |
| 7,966,305 B2 * | 6/2011 | Olsen ............................ | 707/706 |
| 8,606,681 B2 * | 12/2013 | O'Rourke .............. | G06Q 40/06 705/36 R |

(Continued)

OTHER PUBLICATIONS

Zhong, et al., Semantics-Based Personalized Prefetching to Improve Web Performance, 2000, Proceedings of the 20*th* IEEE Conference on Distributed Computing Systems, pp. 1-21.

(Continued)

*Primary Examiner* — Daniel Kuddus
(74) *Attorney, Agent, or Firm* — Hunton & Williams LLP

(57) ABSTRACT

Systems and methods may provide customized integrated indexes and visualization. Sentiment analytics may be based on natural language processing techniques. Users may select from among a range of indexes that reflect a variety of sources. Text scoring metrics or indices may incorporate frequency of mention, link to broker action, sentence location of first mention, etc. Depending on the temporal and sentiment characteristics of interest, the user may select from a range of news sources, research reports, analysts, social media sources, and may assign a customized weight value to each source. The scores may then be merged. After scoring, the user may be presented with news links directly from sentiment indexes (e.g., from top ranking in terms of sentiment scores, etc.). Advanced visualization capabilities may provide output for users to assist in decision making processes.

65 Claims, 9 Drawing Sheets

(56) References Cited

U.S. PATENT DOCUMENTS

| | | | | |
|---|---|---|---|---|
| 8,793,173 B2* | 7/2014 | Berkman | G06Q 30/02 | 705/35 |
| 8,812,647 B1* | 8/2014 | Jain | G06Q 10/10 | 709/223 |
| 8,849,826 B2* | 9/2014 | Minh | G06F 17/30707 | 707/709 |
| 8,909,771 B2* | 12/2014 | Heath | G06Q 30/02 | 705/39 |
| 2005/0055275 A1* | 3/2005 | Newman | G06Q 30/02 | 705/14.41 |
| 2006/0242040 A1* | 10/2006 | Rader | G06Q 40/06 | 705/35 |
| 2009/0036102 A1 | 2/2009 | Ho | | |
| 2009/0265307 A1* | 10/2009 | Reisman | G06F 17/30873 | |
| 2009/0306967 A1* | 12/2009 | Nicolov | G06F 17/2785 | 704/9 |
| 2009/0318777 A1 | 12/2009 | Kameyama | | |
| 2009/0319342 A1* | 12/2009 | Shilman | G06F 17/30864 | 705/7.41 |
| 2010/0093420 A1* | 4/2010 | Wright | G07F 17/329 | 463/17 |
| 2010/0121857 A1* | 5/2010 | Elmore | G06F 17/30702 | 707/748 |
| 2010/0299301 A1 | 11/2010 | Busch et al. | | |
| 2011/0093420 A1* | 4/2011 | Rothenberg | G06Q 10/06 | 706/45 |
| 2011/0173638 A1 | 7/2011 | Nakamae | | |
| 2011/0213742 A1 | 9/2011 | Lemmond et al. | | |
| 2012/0246054 A1* | 9/2012 | Sastri | G06Q 50/01 | 705/37 |
| 2012/0259617 A1* | 10/2012 | Indukuri | G06F 17/2765 | 704/9 |
| 2012/0296845 A1* | 11/2012 | Andrews | G06Q 40/08 | 705/36 R |
| 2013/0091117 A1* | 4/2013 | Minh | G06F 17/30707 | 707/709 |
| 2013/0103667 A1* | 4/2013 | Minh | G06F 17/30864 | 707/709 |
| 2013/0226842 A1 | 8/2013 | Chu et al. | | |
| 2014/0114941 A1 | 4/2014 | Ahlberg et al. | | |
| 2014/0164342 A1* | 6/2014 | Liapis | G06F 17/30864 | 707/706 |
| 2014/0215351 A1* | 7/2014 | Gansca | G06Q 50/01 | 715/751 |
| 2014/0292643 A1* | 10/2014 | Kim | H04N 21/42222 | 345/156 |
| 2015/0100144 A1* | 4/2015 | Lee | H04W 4/005 | 700/94 |

OTHER PUBLICATIONS

Zhang, et al., Informing the Curious Negotiator: Automatic News Extraction from the Internet, 2006, Data Mining, Springer, pp. 176-191.

\* cited by examiner

SYSTEM AND METHOD FOR CUSTOMIZED SENTIMENT SIGNAL GENERATION THROUGH MACHINE LEARNING BASED STREAMING TEXT ANALYTICS

CROSS REFERENCE TO RELATED APPLICATIONS

This application claims the benefit of U.S. Provisional Application No. 61/839,061, filed Jun. 25, 2013. The contents of which are hereby incorporated by reference in their entirety.

BACKGROUND

Specialized documents, such as research reports, have unique structure and characteristics that make it difficult to extract meaningful sentiment or position signal using natural language processing. The corresponding vocabulary of a research report may be subtle and sometimes may not match typical sentiment keywords. For example, the phrase "buyback" may have a sentiment signal associated to it, although none of the keywords have any sentiment. This differs from typical sentiment extraction done with social media that have obvious sentiment keywords. Standard sentiment libraries are more appropriate for social media, since these standard libraries include basic sentiment expressions like love, hate, dislike, despise, adore, etc. Such expressions are not found in research reports.

Furthermore, in many research reports, vocabulary and sentiment signals may be analyst, geography, or segment specific.

These and other deficiencies exist.

SUMMARY OF THE PREFERRED EMBODIMENTS

An exemplary embodiment includes a computer implemented method for digesting a library comprising one or more sources of data; extracting one or more sentiment signals comprising weighted, customized sentiment metrics for words and expressions from the library; calculating normalized profiles for the one or more sources of data based on one or more of geography, sector, analyst, company, and streaming real time data feedback; normalizing the one or more sentiment signals based on text positioning, sentence structure, and data source; and calculating an overall sentiment score.

Another exemplary embodiment includes a computer implemented method for extracting one or more sentiment signals comprising a set of weighted, customized sentiment metrics for words and expressions from a source document; calculating a normalized profile for the source document based on one or more of geography, sector, analyst, and company; cross-checking each of the one or more sentiment signals for consistency within the source document; applying the normalized profile to the one or more sentiment signals; normalizing the one or more sentiment signals based on text positioning, sentence structure, and document type; and calculating an overall sentiment score.

Another exemplary embodiment includes a computer implemented method for digesting a streaming data source comprising one or more sources of data; extracting one or more sentiment signals comprising weighted, customized sentiment metrics for words and expressions from the streaming data source; calculating normalized profiles for the one or more sources of data based on one or more of geography, sector, analyst, company, and streaming real time data feedback; normalizing the one or more sentiment signals based on text positioning, sentence structure, and data source; and calculating an overall sentiment score.

In exemplary embodiments, the preceding methods may be performed using a system with a processor and a memory comprising computer-readable instructions which when executed by the processor cause the processor to perform the method steps.

Another exemplary embodiment includes a system, having a processor and a memory comprising computer-readable instructions which when executed by the processor cause the processor to perform the following steps: digesting one or more sources of data; parsing the one or more sources of data for sentiment and source attributes; fusing the source attributes with the sentiment; linking the sentiment information with its original source, related content, and other related material; weighting the sentiment information based on importance and relevance; storing, in a dynamically weighted dictionary, terms associated with sentiment and concept; outputting an object with dynamic sentiment and attributes.

These and other embodiments and advantages of the preferred embodiments will become apparent from the following detailed description, taken in conjunction with the accompanying drawings, illustrating by way of example the principles of the various exemplary embodiments.

DETAILED DESCRIPTION OF THE PREFERRED EMBODIMENTS

Figure 1:
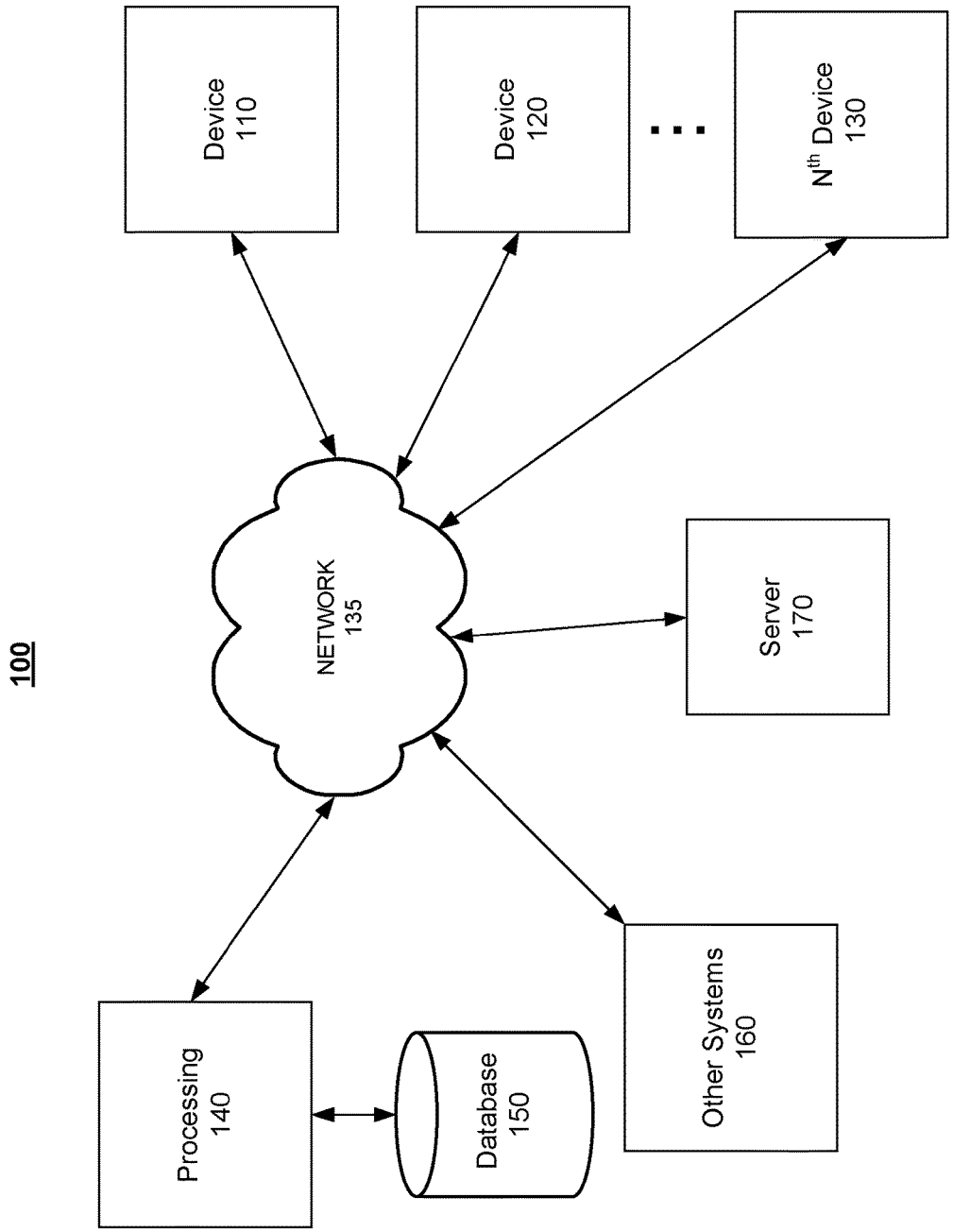
FIG. 1 depicts a system in accordance with an exemplary embodiment.

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments are described to provide an enabling disclosure. Accordingly, the disclosure is not intended to be construed to limit the embodiments or otherwise to exclude any other such embodiments, adaptations, variations, modifications and equivalent arrangements.

The following descriptions are provided of different configurations and features according to exemplary embodiments. These configurations and features may relate to providing financial services to customers. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details of the various embodiments. It should also be appreciated that these exemplary embodiments are provided as non-limiting examples only.

Exemplary embodiments may be applicable to financial institutions. Accordingly, examples used herein may refer to financial institutions or topics related thereto. For example, financial institution research reports may be referred to in exemplary embodiments. Financial institutions, as used herein, may include institutions that provide financial services to their members or customers. For example, financial institutions may include, but are not limited to banks, credit unions, trust companies, mortgage loan companies, insurance companies, investment banks, underwriters, and brokerage firms. It should be appreciated that the exemplary embodiment may be extended to other industries and areas beyond financial institutions. Therefore, the examples used herein are exemplary and meant to be non-limiting.

According to exemplary embodiments, a system and method may be provided relating to customized integrated new indexes and visualization. In an embodiment, sentiment analytics may be based on natural language processing techniques. Users may select from among a range of indexes that reflect a variety of sources. For example, the range of indexes may include machine readable structured news on a variety of topics (such as equities and commodities/energy topics), markets research report index, social media sources, alternative news sources that may be customized by the user, etc. The term sentiment may be used interchangeably with outlook and position.

Text scoring metrics or indices may incorporate frequency of mention, link to broker action, sentence location of first mention, etc. According to exemplary embodiments, text scoring algorithms may be customized. For example, a user may create a customized index by assigning weights to a variety of source feeds. Depending on the temporal and sentiment characteristics of interest, the user may select from a range of news sources, research reports, analysts, social media sources, and may assign a customized weight value to each source. The scores may then be merged. After scoring, the user may be presented with news links directly from sentiment indexes (e.g., from top ranking in terms of sentiment scores, etc.) Emerging topics may also be linked to sentiment indexes.

In some embodiments, machine learning algorithms may be used to dynamically auto-adjust the weights of various sources. Similarly research report references may be stored in graph databases that maintain connectivity and influencer indexes.

In some embodiments, advanced visualization capabilities may provide output for users to assist in decision making processes. The output may include links directly to the sources, such as links to news stories, emerging topics linked to sentiment indexes, and a range or news and sentiment sources with machine learning feedback with customized weight factors.

Exemplary embodiments may therefore include methods for sentiment based position extraction from research reports. Applying text analytics to research reports may provide sentiment signals for key entities. For example, the key entities may include companies, sectors, geographic areas, and global economies. To accomplish the position extraction, expressions in research reports may be sentiment ranked. However, the sentiment expressions are not typically in standard sentiment library. Research reports also typically contain numeric sentiment signals. For example, numeric sentiment signal can include 2x, 50% lower, double, <10%, etc. These signals are not captured by standard sentiment extractors, as they are not verbal but numeric. Once each keyword or signal is identified, a specific sensitivity factor is assigned in a history based look up table. This factor is used to calculate a customized numeric sentiment index.

The sentiment library may be customized to research reports based on historical data analysis. A normalization for industry and analyst language may be performed that acknowledges the unique language and tone of each analyst and research source for precise reading of the position/sentiment signal. Statistical analysis and correlation of each analysts reports may be used as a guideline to customize the weight of keywords and sentiment scores through normalization. If the analyst overall sentiment score is negative over the last 100 reports, whereas the stock itself as well as sentiment score from other sources is neutral, the analysts sentiment score may be weighted and normalized to match. Some sections contain position statements while may contain justification and data. Sentiment extraction weighted by the section in the research report may then be used to capture the positional sentiment. For example, abstract statements and summary/concluding remarks may be highest ranked along with titles. Supporting data and analysis ranked may have different sentiment coefficients.

Custom sentiment signals may be generated by combining research reports with streaming news sources, market index indicators, and social media sentiment indexes through custom weight factors. For social media sources this may include (i) custom translation of short expressions to natural language options and (ii) emoticon, sarcasm identification.

Research reports may be ranked by Analyst Profile: Focus Area (Geo, Sector, Companies), Historical Prediction Accuracy Overall, Topic Prediction Accuracy, # Followers, Influencer Index (through citations, prediction accuracy/look ahead periods), Key conditional statements/keywords watch list.

There may be customizable metrics. For example, news sources <N1, N2, . . . NM>, external news sentiment, research report/analyst positions, social media and blogs <S1, S2, . . . Sn>. Each assigned customized weight factors may be adjusted by the user and preferences. For example, user 1: ranks research reports high with a high weight factor due to the nature of the industry like enterprise machinery while user 2: ranks social media/blogs and news sentiment sources with high weight factors for a stock in retail sector. The system may automatically adjust weights through machine learning based on historical and streaming data The exemplary methods and systems provided herein are provided by way of example, as there are a variety of ways to carry out the methods disclosed herein. The methods as shown in the Figures may be executed or otherwise performed by one or a combination of various systems as described herein. Each block shown in the Figures may represent one or more processes, methods, and/or subroutines carried out in the exemplary method. Each block may have an associated processing machine or the blocks depicted may be carried out through one processor machine. Furthermore, while the steps may be shown in a particular order, it should be appreciated that the steps may be conducted in a different order.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that exemplary systems may be integrated into and run on a computer, which may include a programmed processing machine having one or more processors. Such a processing machine may execute instructions stored in a memory to process the data and execute the methods described herein. Furthermore, exemplary systems may be integrated into and run on one or more computer networks which may each have one or more computers associated therewith. Exemplary systems may be cloud computing type systems.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

FIG. 1 is a system according to exemplary embodiments. System 100 may provide various functionality and features associated with the program. More specifically, system 100 may include a device 110, a second device 120, and an Nth device 130, a network 135, a processing module 140, a database 150, other systems 160, and a server 170.

According to exemplary embodiments, the system 100 may be configured to carry out the methods as described herein. The system 100 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to exemplary embodiments. Each device 110, 120, and 130 may provide processing, display, storage, communications, and execution of commands in response to inputs from a user thereof and respond to requests from the software and/or modules. It should be appreciated that even though the devices 110, 120, and 130 may be referred to in the subsequent description, the system 100 may use any combination of these devices ranging from one device 110 to multiple devices 110, 120, and 130.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100. The devices 110, 120, and 130 may be configured to perform other functions and processing beyond the methods described herein. The devices 110, 120, and 130 may each be a part of a larger system. The devices 110, 120, and 130 may be multi-functional in operation. The devices 110, 120, and 130 may each support the operation and running of one or more applications or programs.

Each device 110, 120, and 130 may have a display and an input device associated therewith. The display may be monochrome or color. For example, the display may be a plasma, liquid crystal, or cathode ray tube type display. The displays may be touch screen type displays. The devices 110, 120, and 130 may have more than one display. The multiple displays may be different types of displays. The display may have sub-displays there on. For example, the device 110, 120 and 130 may have a large display surface. The display for the user interface may occupy a portion or less than the whole of the large display surface.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 110, 120, and 130 may include other devices such as a printer and a device for accepting deposits and/or dispensing currency and coins.

The device 110, 120, and 130 may have one or more cameras, optical sensors, or other sensing devices. The sensors may be computer controlled and may capture digital images.

According to some embodiments, the devices 110, 120, and 130 may be portable electronic devices or mobile electronic devices. The user may interact with the portable electronic device through various input devices (not shown). For example, the portable electronic device may have a display screen to convey information to the user. The display may be a color display. For example, the display may be a Liquid Crystal Display ("LCD"). The portable electronic device may have one or more input devices associated with it. For example, the portable electronic device may have an alpha-numeric keyboard, either physical or virtual, for receiving input. The portable electronic device may have a QWERTY style keyboard, either physical or virtual. The portable electronic device may have a pointing device associated therewith, such as, for example, a trackball or track wheel. The portable electronic device may receive inputs through a touch screen or other contact interface. In some embodiments, gesture based input may be used. A combination of input types may be used. As described above, the portable electronic device may have communication capabilities over both cellular and wireless type networks to transmit/receive data and/or voice communications.

The portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device may include one or more computer processors and be capable of being programmed to execute certain tasks.

The device 110, 120, and 130 may establish communications with other parts of the system 100 over a network 135. Upon successful initiation of communications between the and the network 135 and another part of the system 100, such as, for example, processing module 140 and database 150, data may be exchanged between device 110, 120, and 130 and the particular element over the network 135. Data may be transmitted from device 110, 120, and 130. Data may be transmitted from the other part of the system 100 to the device 110, 120, and 130.

The devices 110, 120, and 130 may be communicatively coupled to the network 135. Accordingly, the devices 110, 120, and 130 may be geographically dispersed. Conversely, two or more of devices 110, 120, and 130 may be located in close proximity. For example, the devices may be located within or near an office complex. Wherever the location of the device 110, 120, and 130, it may still be able to communicatively couple with the network 135 and the components of the system 100.

In some embodiments, the devices 110, 120, and 130 may be other types of computing platforms, such as, for example, a desktop computer or a laptop computer. The devices 110, 120, and 130 may be a combination of computing devices.

The devices 110, 120, and 130 may each be remotely accessible. Remote access may be used to configure, troubleshoot, and wipe the contents of the device, for example.

Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs accordingly to exemplary embodiments. The processing module 140 may consist of one or more servers and/or general purpose computers, each having one or more computer processors associated therewith.

The processing module 140 may have a database 150 communicatively coupled thereto. The database 150 may contain data and information used by the system 100. For example, the database 150 may store the customized library's and other data structures described here. Additional information may be contained therein related to the operation and administration of the system 100.

The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ 15/Category 5 Ethernet connection, a fiber connection, a traditional phone wireline connection, a cable connection or other wired network connection. A wireless network may be used for the transmission and receipt of data.

The system 100 may have other systems 160 associated therewith. These other systems 160 may include various data collection and support systems used by the entity to carry out a variety of functions. The other systems 160 may include equipment and other assets of the entity. The other systems 160 may be associated with third party entities.

It should be appreciated that the server 170 may interact with other parts of the system 100, such as the devices 110, 120, and 130, as well as the processing module 140 and the other systems 160. The server 170 may be a single server or it may be multiple servers. For example, the server 170 may represent multiple servers located in different locations. The server 170 may be a part of a cloud computing system. The server 170 may server a variety of roles in the system 100. In some embodiments, the server 170 may contain the processing module 140 as well as the database 150. In some embodiments, the database 150 may be directly coupled to the server 170.

The server 170 may have one or more storage devices associated therewith. The storage may be local, remote, or a combination thereof with respect to the server 170. The storage may utilize a redundant array of disks (RAID), striped disks, hot spare disks, tape, disk, or other computer accessible storage. In one or more embodiments, the storage may be a storage area network (SAN), an Internet small computer systems interface (iSCSI) SAN, a Fiber Channel SAN, a common Internet File System (CIFS), network attached storage (NAS), or a network file system (NFS). The storage may have back-up capability built-in. The back-up capability of the storage may be used to archive image data for later use. The back-up capability may be used for recovery of data in the event of a failure of the storage.

In some embodiments, the server 170 may be associated with one or more third party entities whereas other portions of the system 100 (e.g., device 110, 120, and 130, processing module 140, database 150, and other systems 160) may be associated with a single entity according to exemplary embodiments, such as, for example, a financial institution.

Figure 2A:
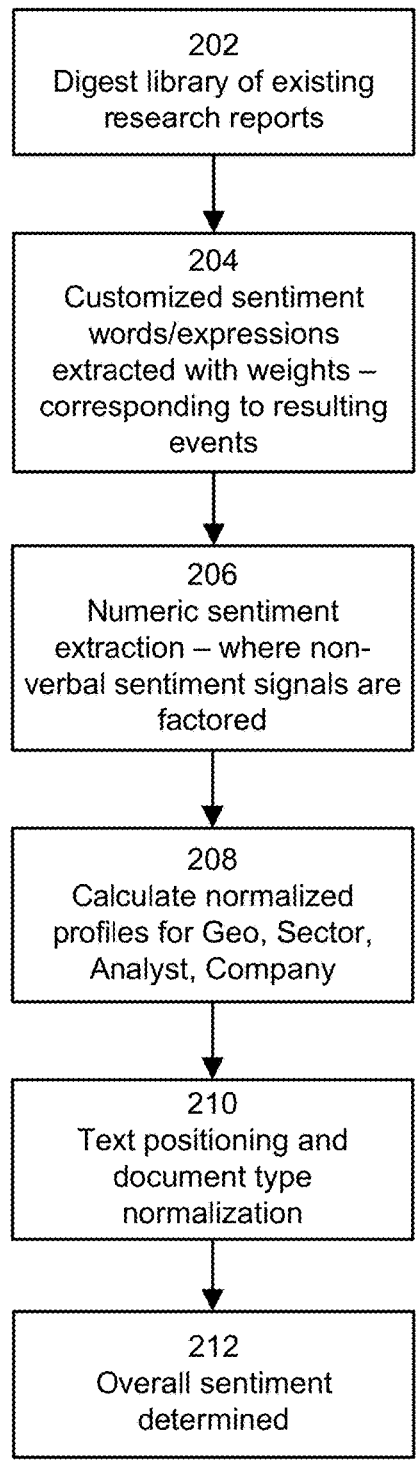
FIG. 2A is a flow chart of a method for sentiment extraction through text analytics in accordance with an exemplary embodiment.

FIG. 2A depicts a flow chart of a method 200 for sentiment extraction through text analytics according to exemplary embodiments of the invention. The method 200 may be used as part of the method 200 to prepare the analytics on a particular source. For example, the method 200 may be used to analyze research reports.

In step 202, a library containing existing research reports may be reviewed and analyzed. The existing research reports may include a historical database of all research reports digested by the text analytics system.

Research reports may have customized keywords and expressions that guide decisions. For example, a financial institution may use research reports to guide investment decisions. The corresponding vocabulary of a research report may be subtle and sometimes may not match typical sentiment keywords. For example, the phrase "stock repurchase" may have a sentiment signal associated to it, although none of the keywords have any sentiment. In many research reports, vocabulary and sentiment signals may be analyst/geography/segment specific. Accordingly, as described herein, such signals may have to be normalized to obtain usable results. Furthermore, reports typically incorporate numbers in many sentence which can be used as signal for sentiment.

A single research report can generate sentiment/position/outlook signals that effect multiple entities in a hierarchy (e.g., industry, segment, individual stocks) as a result, multiple signals may have to be extracted from each report where corresponding entities in the hierarchy get associated with such signals. Accordingly, exemplary embodiments may use an empirical approach where the keywords are sentiment tagged not only based on their financial sector or investment sentiment content but also based on the correlation to actual events (such as stock price drop, etc.). It should be appreciated that while financial related examples are used, these examples are meant to be exemplary and non-limiting.

In some embodiments, the library may contain other sources of data in addition to or besides research reports. For example, the library may contain tabulated data, financial statements, databases, customer records, customer comment records, news articles, legal memoranda, etc. These examples are meant to be exemplary and non-limiting.

In some embodiments, the library may be a data stream. the data stream may be a live stream of data from one or more sources delivered over a computer network.

In step 204, a listing of sentiment words/expressions, associated with weights and their corresponding resulting events, is generated. In some embodiments, a weight may be assigned for each word. For example, if the word "promising" is used often, that word may be associated with a positive result, and may be assigned a high weight, indicating a strong correlation between that word and success. Thus, the word may have a positive sentiment value, in that context.

Text analytics may provide a sentiment signal on a number of key entities. For example, company, sector, geographic location, global economy, etc. Furthermore, standard expressions in research reports may be sentiment ranked that are not typically in a standard sentiment library. For example, standard sentiment libraries may, in some cases, be more appropriate for social media because they including expressions such love, hate, dislike, despise, adore, etc. These are terms not typically found in a research report. In some embodiments, the sentiment signal extracted based on the words/expressions may be referred to as sentiment metrics.

Custom sentiment signals may be generated by combining research reports with streaming news sources, market index indicators, social media sentiment index by custom weight factors. For example, for social media sources custom translation of short expressions to natural language options, including emoticons, as well as sarcasm identification.

In step 206, numeric sentiments may be extracted. The numeric sentiments may include symbols and acronyms also. These numeric sentiment may be referred to a non-verbal sentiments and may be associated with a result and weight. For example, a numeric sentiment signal may include: 2×, 50% lower, double, <10%, etc. Research reports typically contain numeric assessment of signals but these are typically not captured by standard sentiment extractors, as they are not verbal but numeric in nature. For each keyword a specific sensitivity factor is assigned in a history based look up table. This factor is used to calculate a customized numeric sentiment index. Each number may have a different coefficient coupled with the expression that it refers to. Given the polarity of the expression, these numbers can be used as factor to adjust the weight. Furthermore other techniques, such as look-up tables, can be incorporated to map the numbers to expressions (e.g., a 10% drop in profit and a 10% drop in stock price are not identical).

In step 208, a normalized profile is generated. The normalization may be for industry and analyst language that acknowledges the unique language and tone of each analyst and research source for precise reading of the position/sentiment signal. The normalization may be also for geography, sector, and a particular company may be generated. The normalization may be based on historical factors and analysis thereof.

In some embodiments, the normalization can also be per analyst. The sentiment signal generated by a particular analyst can be correlated with the news and events that proceed the expected/predicted events—this information is then fed back to assess the sentiment score of the analyst. For example, some analysts may output more negative sentiment signals then others, which may then be normalized during this stage based on such empirical data.

In step 210, the text positioning (e.g., where mentioned in the document) and document type are be normalized. For example, abstract statements and summary/concluding remarks may be highest ranked along with titles. Supporting data and analysis may be ranked with different sentiment coefficients that are lower.

If the document contains position/sentiment or other expected signals for more than one entity tracked by the system or user (such as multiple stocks, geo, industry, etc.), then multiple sentiment/position signals may be extracted from the document. These signals are then compiled across documents to capture the overall sentiment for the entity (e.g., one research report may evaluate the health and outlook of certain technology companies). From this document multiple sentiment signals are extracted. Then these signals are compiled across documents and presented to the end-user accordingly. For example, the overall sentiment signal for a particular company is presented/visualized where data is coming from multiple research reports.

Similarly each entity has a defined taxonomy in the system, when a sentiment signal is extracted for the hierarchy that the entity belongs to, all the corresponding entities get affected by this. For instance if the research report have a negative sentiment/position/outlook for the technology sector, this hierarchically may affect the signals to the individual entities that are related, such as being in the same technology sector.

In step 212, the overall sentiment for the report is determined. Each assigned customized weight factor may be adjusted by the user and other preferences. For example, user 1 may rank research reports high with a high weight factor due to the nature of the industry while user 2 may rank social media/blogs and news sentiment sources with high weight factors for a stock in retail sector. Additionally, the system may automatically adjust weights through machine learning based on historical and streaming data.

Figure 2B:
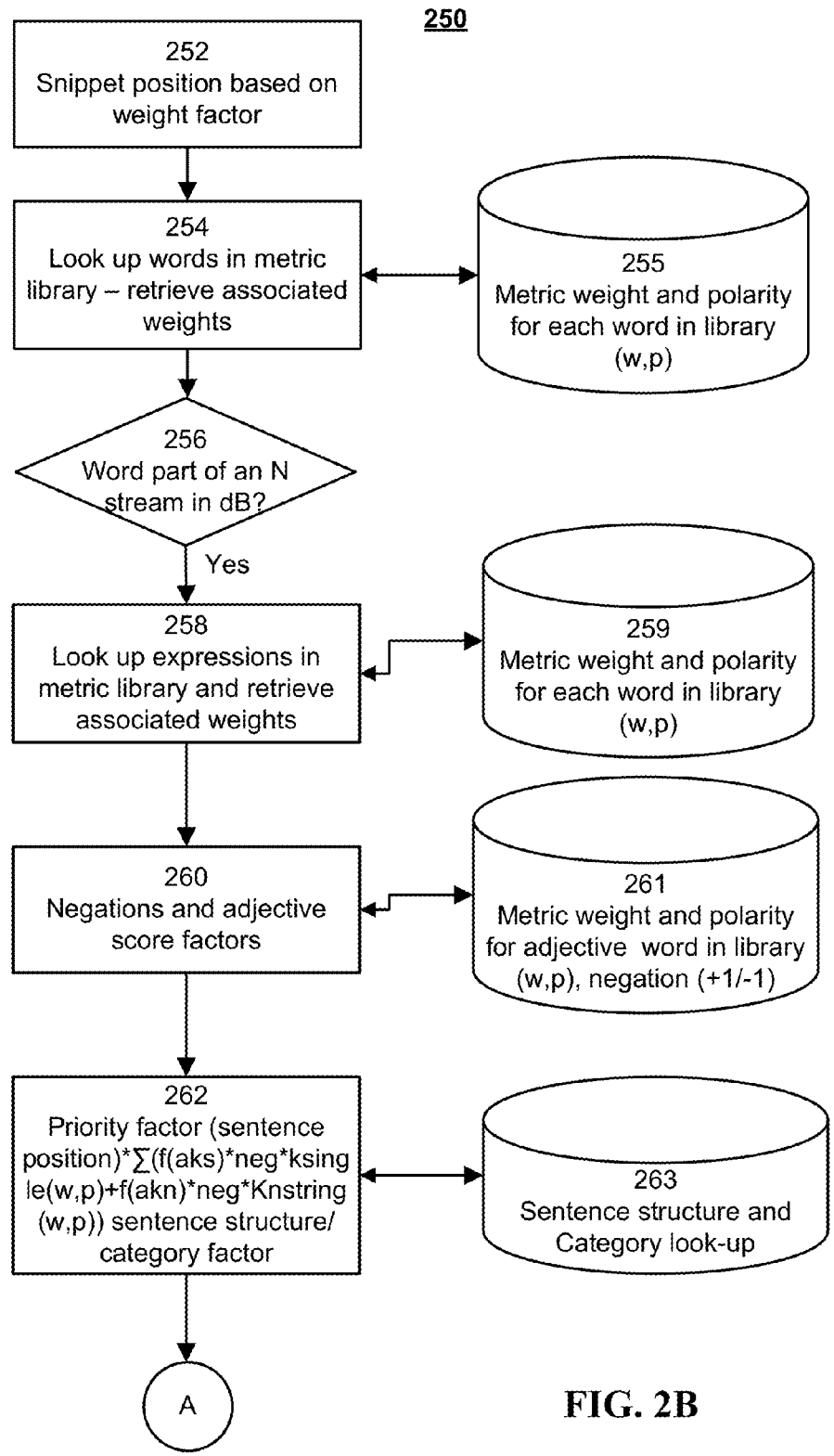
FIG. 2B is a flow chart of a method for analysis through text analytics in accordance with an exemplary embodiment.
Figure 2C:
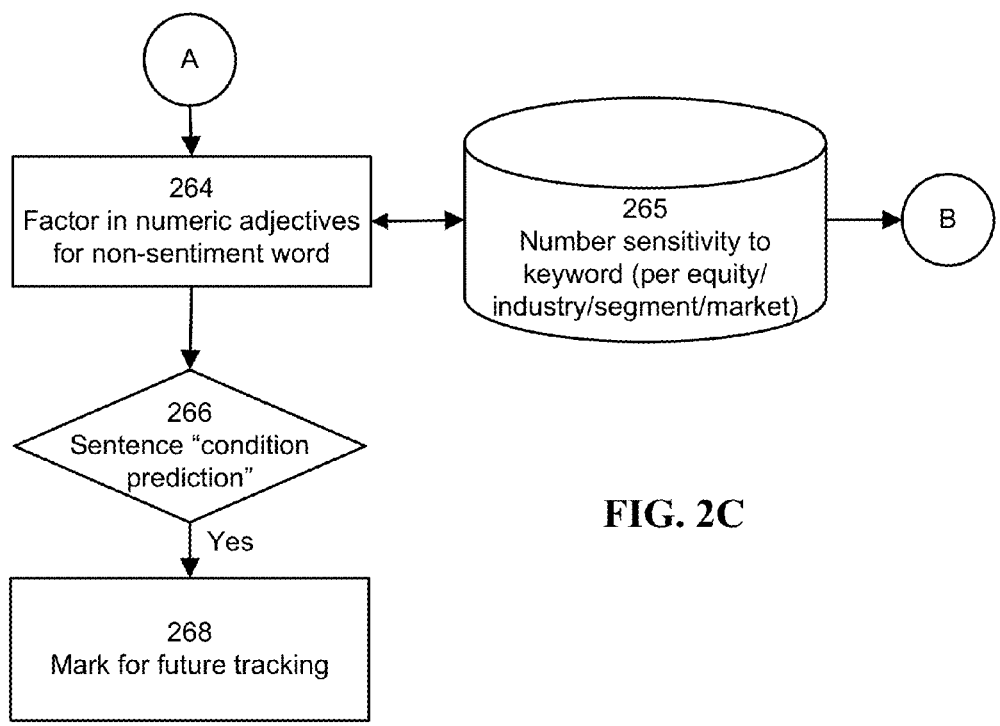
FIG. 2C is a flow chart of a method for analysis through text analytics in accordance with an exemplary embodiment.
Figure 2D:
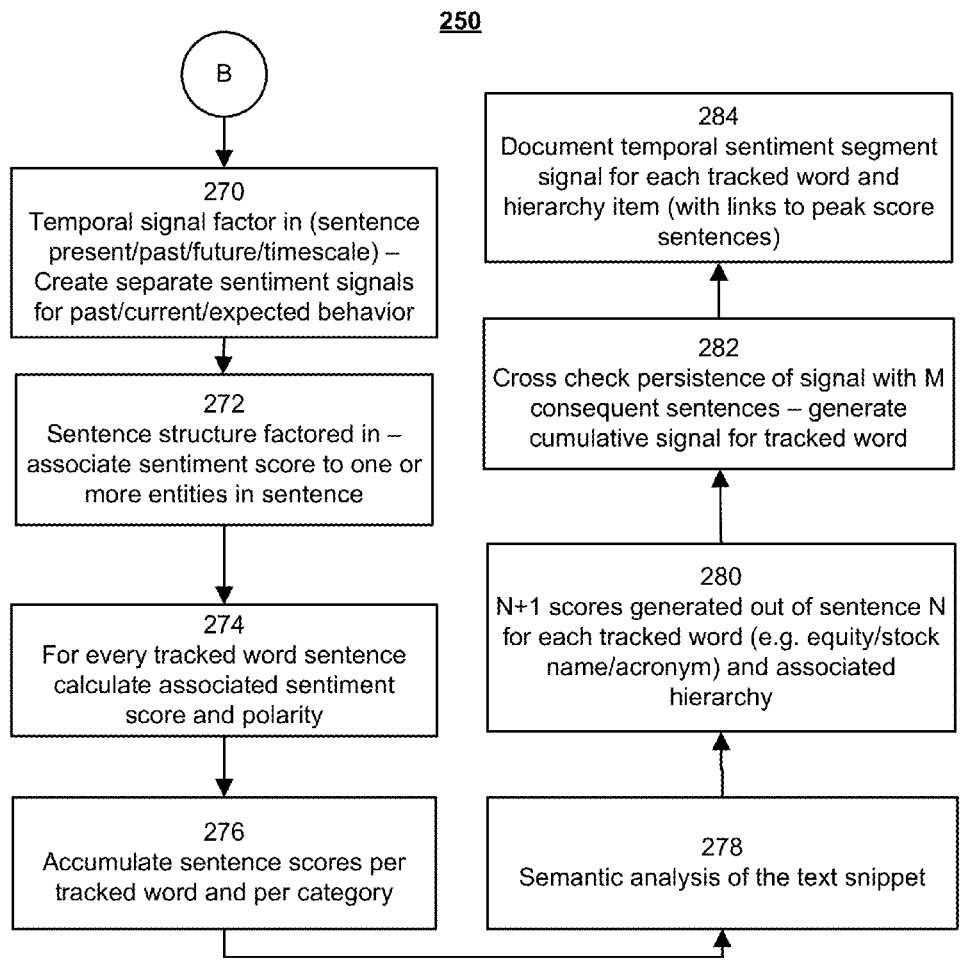
FIG. 2D is a flow chart of a method for analysis through text analytics in accordance with an exemplary embodiment.

FIGS. 2B, 2C, and 2D depict a flow chart of a method 250 for sentiment extraction through text analytics according to exemplary embodiments of the invention. The method 250 may be performed for on each snippet extracted from a source. For example, the snippet may be a sentence or phrase or word. The method 250 may be performed as part of the method 200 in blocks 204 and 206.

For the method 250, the user or the system may track a list of entities to generate signals for them from one/more research reports. Such signals could be stocks or other instruments/entities (e.g., country/geo/etc.). The user may specify a list of entities before starting this signal extraction process by explicitly listing a number of track words (e.g. technology, computer processors, software, etc. with a translation to other keywords that represent the same entity). The list can be extracted from a portfolio automatically. The below method may apply to each snippet.

At block 252, the snippet position based on weight factor is determined.

At block 254, words are looked up in the metric library and associated weights are retrieved. At block 255 the metric weight and polarity for each word in the library (w,p) is located. The polarity may indicate a positive or negative connotation for each word. The weight may take into account the degree of connotation. For example, the words "hate" and "dislike" may both have a negative polarity, however the weights may be different since "hate" has a stronger connotation than "dislike." It should be appreciated that the library is dynamic and may be constantly updated and feeds back the information to the analytics engine as to whether that keyword's sentiment score changed. This may be based on actual events, such as, for example, a stock price changing.

At block 256, it is determined if the word is part of an N stream in dB. If yes, at block 258, expressions are looked-up in the metric library and associated weights are retrieved. At block 259, the metric weight and polarity for each word in the library (w,p) is located.

At block 260, negations and adjective score factors are determined. At block 261, the metric weight and polarity for each word in the library (w,p) is located, as well as the negation (+1/−1). The negation may take into account words such as "not."

At block 262, the priority factor is determined. According to an embodiment, the following formula may be used:

$$(\text{sentence position}) * \Sigma(f(aks) * neg * k\text{single}(w,p) + f(akn) * neg * k\text{string}(w,p)) * (\text{sentence structure or category factor})$$

Where: sentence position: the location of the sentence in the document. For example, the sentence may be in the title or abstract or body. Each particular position may have a different factor; aks: is for a single word; neg: this is for the polarity and can be a negative if required; ksingle: is the weight and polarity of a single word; akn: an expression or phrase (e.g., a multi-word structure); knstring: is the weight and polarity of the expression or phrase; and sentence structure or category: a factor for the sentence structure or category.

At block 263, the sentence structure and category are looked up in support of block 262.

At block 264, numeric adjectives for non-sentiment words are factored in. A numeric adjective may include, for example, "a 50% fall in revenue." At block 265, the number sensitivity to keyword is located (per equity/industry/segment/market).

At block 266, a sentence condition prediction is performed. If yes, then at block 268, the sentence is marked for future tracking.

At block 270, a temporal signal is factored in and sentiment signals for past/current/expected behavior are created.

At block 272, the sentence structure is factored in. A sentiment score is associated to one or more entities in sentence.

At block 274, for every tracked word in sentence, the associated sentiment score and polarity are calculated.

At block 276, sentence scores per tracked word and per category are accumulated.

At block 278, a semantic analysis of the text snippet is performed.

At block 280, N+1 scores are generated out of the sentence N for each tracked word and associated hierarchy. An overall sentiment signal is generated.

A sentiment/position/outlook score is generated at the granularity of a tracked entity. In one embodiment, the user specifies a list of entities to track, such as, for example, equities from a portfolio. A custom track is created accordingly with the corresponding number of entities and analogous structures (e.g., tick, company name, stock name, etc). This list is then used to scan and rank a wide range of documents including streaming news and research reports, for example. An exemplary case of research reports will be illustrated. Thus, for this specific case, if N entities out of the full list of the tracking list are covered in a research report, resulting N different sentiment/outlook/position metric (SoP) scores are generated. For example, from a research report a positive outlook score (or signal, as these terms may be used interchangeably here) may be generated for Company A, a negative score may be generated for Company B, and a neutral score may be generated for the sector. During the compilation phase, the system gathers signals for Company A across number of research reports (similarly for Company B and Company C). For each entity, a customized weight factor is defined such that different sources are factored into the overall calculation with time varying customized weights. This approach is different than document score generation where a sentiment score or signal is generated for a piece of document (as described above).

At block 282, the persistence of signal with M consequent sentences is cross-checked. A cumulative signal for each tracked entity is generated.

At block 284, the temporal sentiment segment signal for each tracked word and hierarchy item is documented, with links to peak score sentences. A general sentiment signal is generated.

The method 250 may use the following exemplary formula for calculating customized signals. For example, the formula may be used to calculate the customized signal for a research report. The formula may perform a similar function, using a different methodology as the formula above at block 262. The formula may be applicable for each Text snippet (i) and for every Track List (j1-jn) in text snippet (i). Accordingly, the formula may be:

$$\text{Metric } M(I,j) = TK_f(i) * Po_f(i) * C_f(i) * P_f * \Sigma Ns(\text{Weight, Polarity, priority}) N_f(i) * S_f * \text{Time Range} * \text{Metric outcome of semantic analysis of snippet}(i)$$

Where: Ns=N Stream Signal: accumulated for each entity in the snippet through historical data look up (as well as statistical correlation of expression with real event priorities)—accumulation may be based on weight, polarity, and priority of each signal from the database. The database may have a customized keyword and expression list where the weight and polarity factors are customized to the specific industry/segment (based on learned behavior) and a general keyword/expression list with weight and polarity factors; $C_f$=Consistency/Flow Factor: where a number of statements in the text contribute positive or negative position/outlook towards a specific entity, an overall consistency factor is calculated. For example, if a number of snippets highlight highly positive signal components and others highly negative, and in the conclusion section of the report, a negative overall evaluation is provided, the overall signal for the tracked entity reflects this distribution of negative/positive components with the resulting score. In another embodiment, if the text supports only negative outlook signal overall the consistency flow factor will reflect this; $TK_f$ Title keyword Factor: If the research report specifically focuses on a tracked entity (e.g., a specific company) in the title, then this factor is carried out throughout to customize the weight factors. A signal generated from a report with the matching keyword will be ranked higher for the overall signal calculation across reports; $Po_f$=Position Factor: location of the snippet in the structure of the text (e.g. title, abstract, conclusion statements have high position factors)*Title keyword look up (may be the importance of the section compared to the rest of the text—similar to position factor research report structure provides guidelines for priority factor look up). Metric outcome of the full semantic analysis of the snippet; $N_f$=Numeric factor: selection of non-sentiment keywords—numeric sensitivity factors are defined. Such factors are taken into consideration when the snippet is processed. If the text snippet includes keywords with numeric factors, then these sentences are processed to reflect the sensitivity of the keyword to the number. For example, a "−2% growth" generates a negative signal even though the keyword growth has a positive signal associated to it without a numeric multiplier. Similarly, a "−2% growth" is different from "−2% profit growth" where the keyword profit is taken into account to calculate the specific sensitivity factor; $S_f$=Structure factor: match to well-known position statements and associated weight factors based on statistical analysis of historical data. Number of tracking list items referred in the sentence (individuality). Snippet structure—conditional statement, question, etc.; and $P_f$=Persistence factor: for matching of signal from consecutive snippets or scattered snippets in the same document. This may have a Time Range: Statement/sentiment signal temporal specifications (current, past, future event—6 months, 12 months, etc.). It should be noted that each signal may also automatically impact the signal in the hierarchy (top/down and bottom/up). For example, segment, market statement/signals affecting individual equities. As a result, if there are N tracking list entities mentioned in the research report there might be N-3N signals generated out of the research report depending on the time component of the signal. For example, if all snippets relate to future events, only N signals may be generated (one per entity); however, if some snippets relate to future and some past events for a specific entity these signals are separated temporally.

Figure 3:
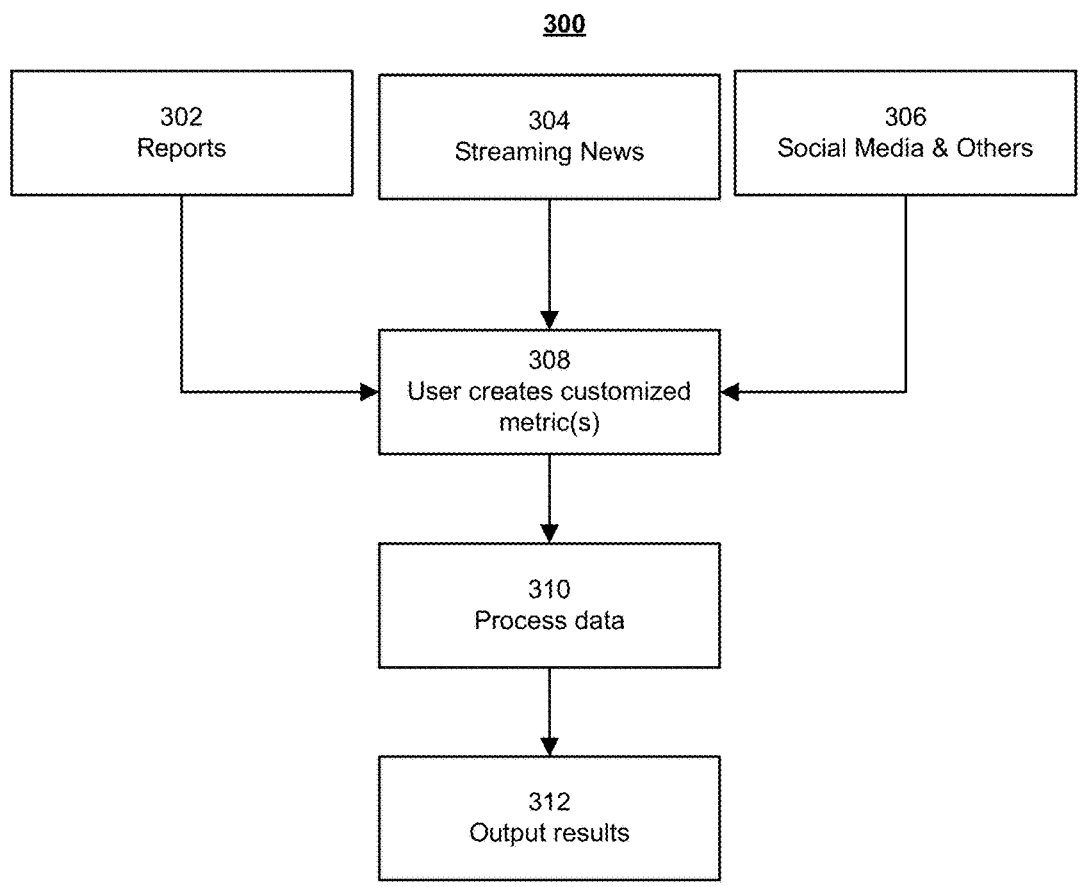
FIG. 3 is a flow chart of a method customized integrated new indexes and visualization in accordance with an exemplary embodiment.

FIG. 3 depicts a flow chart of a method of customized integrated indexes and visualization according to exemplary embodiments of the invention.

In the method 300, at steps 302, 304 and 306, data is received from different sources. For example, the sources may include reports 302, streaming news 304, and social media 306. The reports 302 can be any type of report from different sources, such as, for example, research reports from government and private entities, consumer indexes, reference material, and other sources of data and evaluative material. In some embodiments, social media 306 can include other sources, such as, for example, streaming phone records from a sales department or group. In other embodiments, additional data sources may be received as necessary and/or desired. As part of the data receipt, customized metrics, such as text analytics and natural language processing, may be applied to the reports 302, as described below. The streaming news 304 may have a streaming news analytic signal, and the social media 306 may include a sentiment index. The data received in each of steps 302, 304, and 306 may be received from a third party that serves as an initial processor and/or aggregator of the data.

In step 308, the user creates customized metric(s) to process the data. The metrics may alternatively referred to an index, such as, for example, a sentiment or position or outlook index. This may include the weight to assign to each data source, subset of the data source, etc. This step may be optional. The indexes can be created by the user or they can be created by the system itself through machine learning algorithms or guidelines that specify what type of financial tool would be represented with what mix of signals. The user can customize his/her own indexes from scratch or based on the mixes options provided by the system.

Exemplary embodiments may include the following formula for calculating a customized user sentiment signal. This formula may be applicable for each user Specific Combined Signal:

For i:1→N. Accordingly, the formula may be:

$$\Sigma sdi * wi (\text{for given product/topic type } j) * Cc(i) * Pf(t) * IC * etw(tl-tn) * lwf$$

Where: sdi=Streaming data source i: (1-N) indicates the sentiment and position signal received from data source i; wi=Weight factor source i: is the custom weight factor assigned to the streaming data source for the specific topic (e.g., product, equity, etc.), the weight factor is a function of time and is not constant, so during different periods different sources may be weighted higher/lower to customize the resulting composite signal. The system may incorporate a look-up table that is updated with machine learning algorithms using real-time and historical data. The look-up table may incorporate base weights for different sources based on the nature of the entity. For example, if the entity is a retail company, the social media and blog sources may be weighted more heavily. Base values can be created on the characteristics of the entity, then the machine learning algorithms can be used to fine tune these weight factor parameters. Users may also overwrite or directly input weight factors. Thus, the weight factor has 3 components: 1.

Basic weight (wb) as specified in the look-up table (using data on the characteristics of the entity), 2. Machine learning based dynamic weight factor (wm) using real-time streaming data on the entity, and 3. User specified weight factor (wu) that can be used to customize the weight factor based on users own preferences; Pf=Signal Strength Persistence Factor: persistence of the sentiment signal over time (for imposter signals reversals are common and eliminated by factoring persistence of signal over time); Cc=Cross Channel Correlation: correlation of the signal among multiple channels (if the signal is incorrect it is likely to be inconsistent with other sources); IC=Inherent confidence factor: assigned to the source for the given topic/product (This is looked up in a history table). For non-retail equity types sources like Twitter or other social media may not have high confidence scores (institutional number releases may have higher confidence factor over social media overall); etw=Effective Time window: specifies the time window signal is effective (e.g., user can incorporate some news sources over limited period of time, e.g., beginning of each quarter, special institutional report news streams during periods when news/releases are expected etc. customer indexes, real estate, retail indexes, etc.). The weight factors may also customized over effective time windows. For example, a news source may be weighted higher during a specific day/hours than the weight may be reduced; and lwf=Learning weight factor: Each component also has a custom learning weight factor automatically generated by machine learning algorithm (to best fit the model to historical behavior). Other dynamic factors (market indicators, institutional rankings/positions, etc. may be customized sources by the user).

In step 310, the received data is processed according to the customized metric(s) or index(es). The customized metrics incorporate different streaming data source, such as machine readable news, social media sources, and research reports. Some sources may not be as trusted as other sources. In order to prevent potential spoofing and false reports, additional metrics may be incorporated to capture such issues. For example, the combination of the Pf, Cc, and Ic from above can be used to prevent such instances by incorporating inherent confidence factors, cross-channel correlation, and a signal persistence factor. False or spoofed reports may be factored out accordingly.

In step 312, the results of the individual results along with the customized metrics are output for review using visualization techniques. Visualization tools may be used to present and review the results. For example, the results may be provided graphically along with links to the actual source as well as a summary of the customized metric(s) applied during the processing of the data. Each separate source and its results may be viewable individually. Additionally, filtered results may be displayed for the user's review.

Figure 4A:
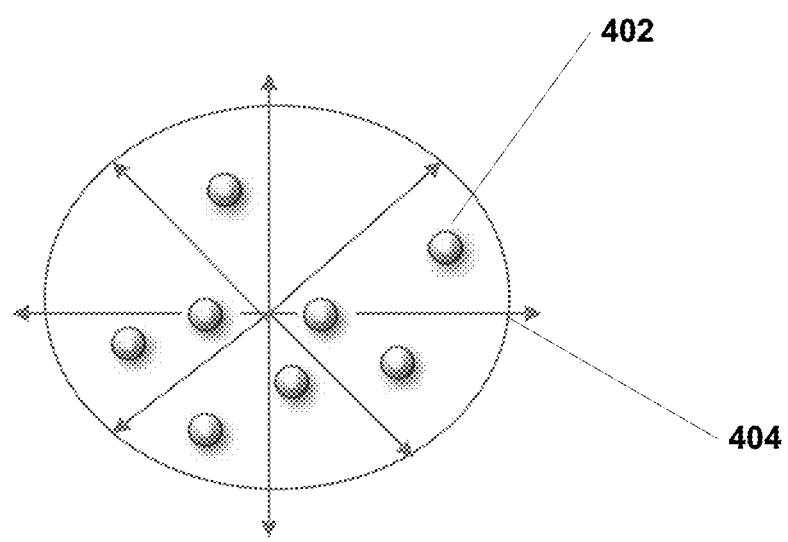
FIG. 4A depicts a visualization of sentiment keywords according to an exemplary embodiment.

FIG. 4A depicts a visualization of sentiment keywords according to an exemplary embodiment. The visualization 400 may represent a 2-dimensional scale against which objects 402 extracted from a source, such as text or signals from a research report, for example, may be plotted to assist a user in visualization of the words or semantic signals or indexes. The visualization 400 may be color coded. For example, each sector of the visualization 400 may be shaded to indicate the strength or positive/negative connotation of the semantic keyword. In some embodiments, green may be used for positive semantic signals and red for negative semantic signals with shades of yellow/orange in between. The objects may also be placed a varying distances from the center of the visualization to indicate weighting of the word with respect to the subject. Closer to the center may represent a more heavily weighted, relevant signal. The distance may represent different levels in a hierarchy. The x-axis 404 may be the dividing line for positive and negative polarity. For example, above the x-axis 404 may be positive and below may be negative.

Each object 402 plotted may be a link back to the source material such that the user can access the source document to provide further insight into the object, e.g., semantic keyword, in its context. Each object 402 may represent a particular entity or thing, such as, for example, a stock. The objects 402 plotted may be filtered such that each is only from a particular source. Accordingly, the visualization 400 may have versatility and enable the display of different data.

Figure 4B:
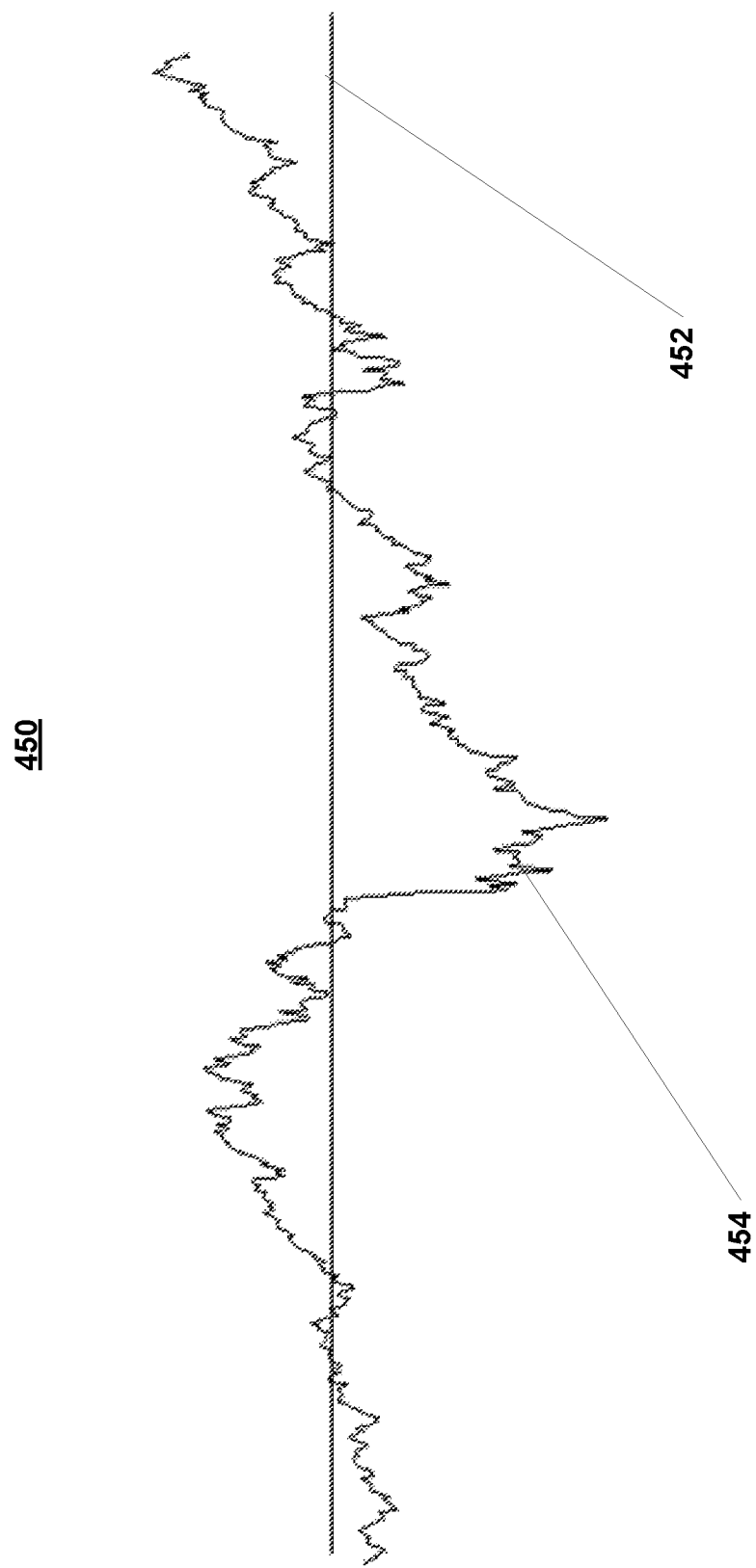
FIG. 4B is an example graph of a temporal signal of semantic keywords according to exemplary embodiments.

Alternatively, the semantic keywords may be plotted as a color coded temporal signal. FIG. 4B is a graph of a temporal signal of semantic keywords according to exemplary embodiments. The graph 450 has a linear axis 452 representing time with a signal 454 plotted thereon. The time scale may be in any particular time increment. For example, days, hours, or minutes may be used. Above the axis 452 may be positive signals or positions and below may be negative.

Figure 5:
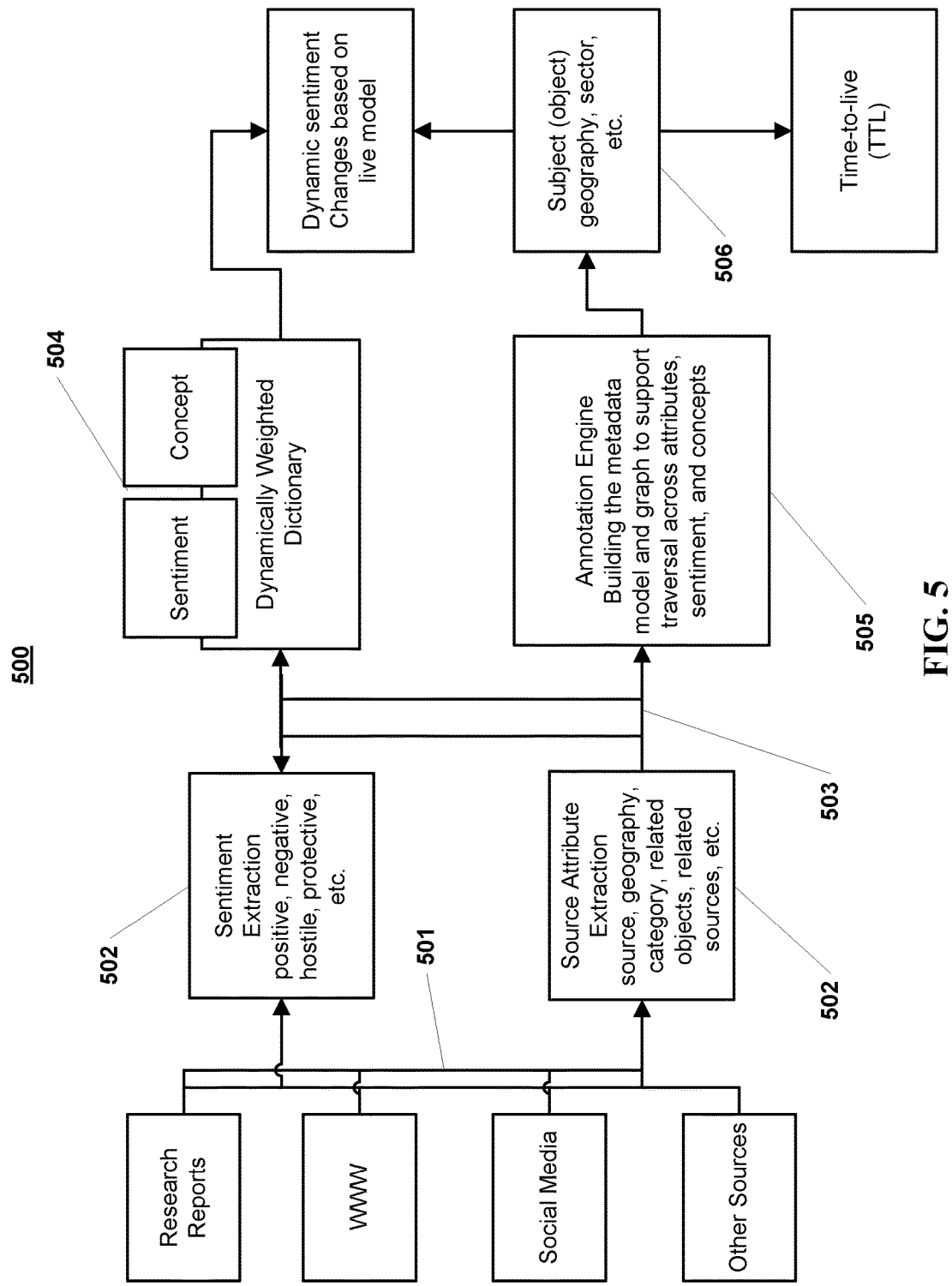
FIG. 5 depicts a system architecture in accordance with an exemplary embodiment.

FIG. 5 depicts a system architecture in accordance with an exemplary embodiment. The system 500 may represent a flow for a system according to exemplary embodiments.

At 501, data is ingested from a multitude of sources including research reports, the Internet, social media, etc. The data may come from one or more of these sources. A combination of sources may input data. In exemplary embodiments, there is not limitation on the type of content.

At 502, in serial or parallel, content is parsed for sentiment and key attributes.

At 503, source attributes are extracted and forwarded to the annotation engine to fuse with the sentiment signal. The sentiment information is linked with the original source, related content, and other related material. Each is weighted with importance and relevance.

At 504, a dynamically weighted dictionary stores the terms associated with sentiment and concept. The terms may be stored in a domain specific manner. The weights associated with these words are based on dynamic factors internal and external to the system. For example, the geographic region's weather, a specific sector's news, or the frequency of events internal to the system all may change how important the terms are as well as the strength of sentiment and concept.

At 505, the annotation engine fuses the sentiment with the attributes where the sentiment is a dynamically calculable or queriable weighted taxonomy and the attributes are descriptive, allowing a graphical traversal of all attributes, sentiment, and concepts.

At 506, the output is an object that has dynamic sentiment and attributes. Additionally, it can have a time to live that invalidates the object based on a variety of criteria or simply based on time. For example, live for 2 minutes from the present, live until a specific event occurs, or live until a price drops below a certain threshold. It should be appreciated that these are non-limiting examples. In some embodiments, the object may have an indefinite time to live.

Hereinafter, aspects of implementation of the inventions will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, REXX, Ruby, Visual Basic, X10, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of non-transitory media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of financial services, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:
1. A computer implemented method, comprising:
extracting, by the computer processor, one or more sentiment signals comprising weighted, customized sentiment metrics for words and expressions from a library comprising one or more research reports from one or more sources;
calculating normalized profiles for the one or more sources of data based on one or more of geography, sector, analyst, company, and streaming real time data feedback;
normalizing, by the computer processor, the one or more sentiment signals based on text positioning, sentence structure, and data source;
calculating an overall sentiment score;

receiving, by the computer processor, one or more data streams;

receiving, by the computer processor, a set of weighted, customized metrics based on the one or more sentiment signals wherein the set of weighted, customized metrics is received from a dynamically updated database that assigns and updates sentiments based on empirical data, customizes factors based on analyst, sectors, and geography, and comprises numeric sensitivity factors for numeric expressions;

applying the set of weighted, customized metrics to the one or more data streams;

outputting, by the computer processor, a customized data stream that is a result of the application of the set of weighted, customized metrics;

ranking the one or more sentiment signals based on the overall sentiment score; and providing a visualization of the ranking including a link to each source associated with the one or more sentiment signals.

2. The method of claim 1, further comprising:

extracting, by the computer processor, one or more second sentiment signals comprising one or more of numeric expressions, acronyms, and symbols; and linking, by the computer processor, the one or more second sentiment signals to words and expressions to which sentiment of the one or more second sentiment signals refers to.

3. The method of claim 1, wherein the research reports are related to a financial institution.

4. The method of claim 1, wherein the one or more sentiment signals are extracted temporally based on a structure and context of a sentence containing the sentiment signal.

5. The method of claim 1, wherein each word or expression has one or more sentiment metrics that have a sentiment that varies temporally.

6. The method of claim 1, wherein each word or expression has one or more sentiment metrics that have a sentiment that varies contextually.

7. The method of claim 1, wherein the one or more sentiment signals span two or more sources of data and are merged based on entity characteristics and a look-up table.

8. The method of claim 1, wherein the normalized profiles comprise a vector of factors.

9. The method of claim 1, wherein the one or more sentiment signals are dynamically weighted and polarized based on empirical data.

10. The method of claim 1, wherein the one or more sentiment signals pertain to more than one entity.

11. The method of claim 10, further comprising:

combining each of the one or more sentiment signals for the more than one entity.

12. The method of claim 1, wherein the one or more sentiment signals span across two or more sources of data in the library.

13. The method of claim 12, wherein the one or more sentiment signals pertain to more than one entity.

14. The method of claim 13, further comprising:

combining each of the one or more sentiment signals for the more than one entity.

15. The method of claim 12, further comprising:

performing a cross check of the one or more sentiment signals for consistency within the library.

16. The method of claim 1, wherein the one or more sentiment signals are extracted across a hierarchy within a given taxonomy of entities.

17. The method of claim 1, wherein the one or more data streams comprise reports, streaming news, and social media.

18. The method of claim 1, wherein the numeric sensitivity factor is dynamically updated on a per entity basis.

19. The method of claim 1, wherein the outputting comprises multi-dimensional and temporal visualization of the sentiment.

20. The method of claim 1, wherein the outputting comprises a visualization of the customized data stream.

21. The method of claim 20, wherein the visualization comprises a composite signal based on the one or more data streams.

22. The method of claim 20, wherein the visualization comprises rendering the customized data stream separately for each of the one or more data streams, wherein each separate rendered data stream is color coded.

23. A computer implemented method, comprising:

extracting, by computer processor, one or more sentiment signals comprising a set of weighted, customized sentiment metrics for words and expressions from a source document;

calculating a normalized profile for the source document based on one or more of geography, sector, analyst, and company;

cross-checking each of the one or more sentiment signals for consistency within the source document;

applying the normalized profile to the one or more sentiment signals;

normalizing, by the computer processor, the one or more sentiment signals based on text positioning, sentence structure, and document type;

calculating an overall sentiment score;

receiving, by the computer processor, one or more data streams;

receiving, by the computer processor, a set of weighted, customized metrics based on the one or more sentiment signals wherein the set of weighted, customized metrics is received from a dynamically updated database that assigns and updates sentiments based on empirical data, customizes factors based on analyst, sectors, and geography, and comprises numeric sensitivity factors for numeric expressions;

applying the set of weighted, customized metrics to the one or more data streams;

outputting, by the computer processor, a customized data stream that is a result of the application of the set of weighted, customized metrics; and ranking the one or more sentiment signals based on the overall sentiment score; and providing a visualization of the ranking including a link to each source associated with the one or more sentiment signals.

24. A computer implemented method, comprising:

extracting, by the computer processor, one or more sentiment signals comprising weighted, customized sentiment metrics for words and expressions from a live streaming data source comprising one or more sources of data delivered over a computer network;

calculating normalized profiles for the one or more sources of data based on one or more of geography, sector, analyst, company, and streaming real time data feedback;

normalizing, by the computer processor, the one or more sentiment signals based on text positioning, sentence structure, and data source;

calculating an overall sentiment score;

receiving, by the computer processor, one or more data streams;

receiving, by the computer processor, a set of weighted, customized metrics based on the one or more sentiment signals wherein the set of weighted, customized metrics is received from a dynamically updated database that assigns and updates sentiments based on empirical data, customizes factors based on analyst, sectors, and geography, and comprises numeric sensitivity factors for numeric expressions;

applying the set of weighted, customized metrics to the one or more data streams;

outputting, by the computer processor, a customized data stream that is a result of the application of the set of weighted, customized metrics;

ranking the one or more sentiment signals based on the overall sentiment score; and providing a visualization of the ranking including a link to each source associated with the one or more sentiment signals.

25. The method of claim 24, further comprising:
extracting, by the computer processor, one or more second sentiment signals comprising one or more of numeric expressions, acronyms, and symbols; and
linking, by the computer processor, the one or more second sentiment signals to words and expressions to which sentiment of the one or more second sentiment signals refers to.

26. The method of claim 24, wherein the one or more sentiment signals are extracted temporally based on a structure and context of a sentence containing the sentiment signal.

27. The method of claim 24, wherein each word or expression has one or more sentiment metrics that have a sentiment that varies temporally.

28. The method of claim 24, wherein each word or expression has one or more sentiment metrics that have a sentiment that varies contextually.

29. The method of claim 24, wherein the one or more sentiment signals span two or more sources of data and are merged based on entity characteristics and a look-up table.

30. The method of claim 24, wherein the normalized profiles comprise a vector of factors.

31. The method of claim 24, wherein the one or more sentiment signals are dynamically weighted and polarized based on empirical data.

32. The method of claim 24, wherein the one or more sentiment signals pertain to more than one entity.

33. The method of claim 32, further comprising:
combining each of the one or more sentiment signals for the more than one entity.

34. The method of claim 24, wherein the one or more sentiment signals span across two or more sources of data in the streaming data source.

35. The method of claim 34, wherein the one or more sentiment signals pertain to more than one entity.

36. The method of claim 35, further comprising:
combining each of the one or more sentiment signals for the more than one entity.

37. The method of claim 34, further comprising:
performing a cross check of the one or more sentiment signals for consistency within the streaming data source.

38. The method of claim 24, wherein the one or more sentiment signals are extracted across a hierarchy within a given taxonomy of entities.

39. The method of claim 24, wherein the one or more data streams comprise reports, streaming news, and social media.

40. The method of claim 24, wherein the numeric sensitivity factor is dynamically updated on a per entity basis.

41. The method of claim 24, wherein the outputting comprises multi-dimensional and temporal visualization of the sentiment.

42. The method of claim 24, wherein the outputting comprises a visualization of the customized data stream.

43. The method of claim 42, wherein the visualization comprises rendering the customized data stream separately for each of the one or more data streams, wherein each separate rendered data stream is color coded.

44. The method of claim 24, wherein the visualization comprises a composite signal based on the one or more data streams.

45. A system, comprising:
a processor; and
a memory comprising computer-readable instructions which when executed by the processor cause the processor to perform the steps comprising:
extracting one or more sentiment signals comprising weighted, customized sentiment metrics for words and expressions from a library comprising one or more sources of data;
calculating normalized profiles for the one or more sources of data based on one or more of geography, sector, analyst, company, and streaming real time data feedback;
normalizing the one or more sentiment signals based on text positioning, sentence structure, and document type;
calculating an overall sentiment score;
receiving one or more data streams;
receiving a set of weighted, customized metrics based on the one or more sentiment signals wherein the set of weighted, customized metrics is received from a dynamically updated database that assigns and updates sentiments;
applying the set of weighted, customized metrics to the one or more data streams;
outputting a customized data stream that is a result of the application of the set of weighted, customized metrics;
ranking the one or more sentiment signals based on the overall sentiment score; and
providing a visualization of the ranking including a link to each actual source associated with the one or more sentiment signals.

46. The system of claim 45, further comprising:
extracting one or more second sentiment signals comprising one or more of numeric expressions, acronyms, and symbols; and
linking the one or more second sentiment signals to words and expressions to which sentiment of the one or more second sentiment signals refers to.

47. The system of claim 45, wherein the normalized profiles comprise a vector of factors.

48. The method of 45, wherein the weighted, customized metrics are updated in real time in the dynamically updated database through machine learning.

49. The system of claim 45, wherein the one or more data streams comprise reports, streaming news, and social media.

50. The system of claim 45, wherein the sources of data comprise research reports.

51. The system of claim 50, wherein the research reports are related to a financial institution.

52. The system of claim 45, wherein the one or more sentiment signals is dynamically weighted and polarized based on empirical data, wherein further the weights and polarity are dynamically updated.

53. The system of claim 45, wherein the one or more sentiment signals pertains to more than one entity.

54. The system of claim 45, wherein the one or more sentiment signals span across two or more research reports in the library.

55. The system of 45, further comprising:
performing a cross check of the one or more sentiment signals within the library for consistency.

56. The system of claim 45, wherein the dynamically updated database assigns and updates sentiments based on empirical data comprising market data.

57. The system of claim 45, wherein the dynamically updated database customizes factors based on analyst, sectors, and geography.

58. The system of claim 45, wherein the dynamically updated database comprises numeric sensitivity factors for different keywords and expressions.

59. The system of claim 45, wherein the dynamically updated database captures customized keywords and expressions related to financial and investment applications.

60. A system, comprising:
a processor; and
a memory comprising computer-readable instructions which when executed by the processor cause the processor to perform the steps comprising:
parsing one or more sources of data for sentiment and source attributes;
extracting source attributes from the one or more sources of data;
fusing the source attributes with the sentiment;
linking the sentiment information with its original source, related content, and other related material;
weighting the sentiment information based on importance and relevance;
storing, in a dynamically weighted dictionary, terms associated with sentiment and concept;
outputting an object with dynamic sentiment and attributes;
receiving one or more data streams;
receiving a set of weighted, customized metrics based on one or more sentiment signals wherein the set of weighted, customized metrics is received from a dynamically updated database that assigns and updates sentiments based on empirical data, customizes factors based on analyst, sectors, and geography, and comprises numeric sensitivity factors for numeric expressions;
applying the set of weighted, customized metrics to the one or more data streams; and
outputting a customized data stream that is a result of the application of the set of weighted, customized metrics.

61. The system of claim 60, wherein the one or more sources of data comprise one or more of research reports, the Internet, and social media.

62. The system of claim 45, wherein the terms are stored in a domain specific manner.

63. The system of claim 45, wherein the dynamically weighted dictionary associated weights with its contents based on dynamic factors that are internal and external to the system.

64. The system of claim 45, wherein the sentiment is a dynamically calculable or queriable weighted taxomony and the source attributes are descriptive and are configured to allow a graphical traversal of all attributes, sentiment, and concepts.

65. The system of claim 45, wherein the object has a lifespan comprising a set period of time and the object is after the set period of time.

\* \* \* \* \*